(12) United States Patent
Zhang et al.

(10) Patent No.: US 9,374,204 B2
(45) Date of Patent: *Jun. 21, 2016

(54) TRANSMISSION METHOD AND APPARATUS FOR CANCELLING INTER-CARRIER INTERFERENCE

(71) Applicant: KONINKLIJKE PHILIPS N.V., Eindhoven (NL)

(72) Inventors: Xiaobo Zhang, Shanghai (CN); Ni Ma, Shanghai (CN); Matthew P. J. Baker, Redhill (GB); Qi Zhou, Shanghai (CN); Gang Wu, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 269 days.

This patent is subject to a terminal disclaimer.

(21) Appl. No.: 13/955,022

(22) Filed: Jul. 31, 2013

(65) Prior Publication Data

US 2013/0308587 A1     Nov. 21, 2013

Related U.S. Application Data

(63) Continuation of application No. 12/438,161, filed as application No. PCT/IB2007/053154 on Aug. 9, 2007, now Pat. No. 8,520,750.

(30) Foreign Application Priority Data

Aug. 21, 2006  (CN) .......................... 2006 1 0121323

(51) Int. Cl.
*H04L 5/00*      (2006.01)
*H04L 25/03*     (2006.01)
*H04L 27/26*     (2006.01)

(52) U.S. Cl.
CPC ........ *H04L 5/0032* (2013.01); *H04L 25/03159* (2013.01); *H04L 25/03343* (2013.01); *H04L 27/2602* (2013.01); *H04L 2025/03414* (2013.01)

(58) Field of Classification Search
CPC .............. H04L 5/0032; H04L 27/2602; H04L 25/03343; H04L 25/03159; H04L 2025/03414
See application file for complete search history.

(56) References Cited

U.S. PATENT DOCUMENTS 7,864,905 B2 * 1/2011 Wu .................... H04L 25/03057
375/316
8,027,417 B2 * 9/2011 Jia ........................ H04B 7/0067
375/347

(Continued)

FOREIGN PATENT DOCUMENTS

AU   WO 2006111843 A1 * 10/2006 ........ H04L 25/03006
EP             1496659 A1    1/2005

OTHER PUBLICATIONS

Sathanathan et al, "New ICI Reduction Schemes for OFDM System", IEEE Vehicular Technology Conference, vol. 2 of 4, Conf. 54, Oct. 7, 2001, pp. 834-838.

(Continued)

*Primary Examiner* — Andrew Lai
*Assistant Examiner* — Chuong M Nguyen

(57) ABSTRACT

The present invention provides a transmission method and apparatus for cancelling inter-carrier interference in wireless communication systems. Particular carriers are not used for data transmission but carry weighted data to cancel the ici interference of a first group of interfering sub-carriers onto a second group of victim sub-carriers. The weights are inversely proportional to the frequency offset between the interfering sub-carriers and the victim sub-carriers.

15 Claims, 5 Drawing Sheets

(56) References Cited

U.S. PATENT DOCUMENTS

| | | | | |
|---|---|---|---|---|
| 8,520,750 B2* | 8/2013 | Zhang | ............... | H04L 25/03159 370/203 |
| 2005/0147176 A1* | 7/2005 | Yun | ..................... | H04L 27/2647 375/260 |
| 2005/0259568 A1* | 11/2005 | Yeh | ....................... | H04L 1/0625 370/208 |
| 2006/0171354 A1* | 8/2006 | Tee | ....................... | H04L 1/0045 370/329 |
| 2006/0239367 A1* | 10/2006 | Wilhelmsson | .... | H04L 25/03006 375/260 |

OTHER PUBLICATIONS

Jean Armstrong, "Analysis of New and Existing Methods of Reducing Intercarrier Interference Due to Carrier Frequency Offset in OFDM", IEEE Transactions on Communications, vol. 47, No. 3, Mar. 1999, pp. 365-369.

* cited by examiner

TRANSMISSION METHOD AND APPARATUS FOR CANCELLING INTER-CARRIER INTERFERENCE

This application claims the benefit or priority of and describes relationships between the following applications: wherein this application is a continuation of U.S. patent application Ser. No. 12/438,161, filed Feb. 20, 2009, which is the National Stage of International Application No. PCT/IB2007/053154, filed Aug. 9, 2007, which claims the priority of foreign application CN 200610121323.1 filed Aug. 21, 2006, all of which are incorporated herein in whole by reference.

The invention relates to wireless communication systems, and more particularly, to a transmission method and apparatus for cancelling inter-carrier interference in multi-carrier communication systems.

OFDM (Orthogonal Frequency Division Multiplexing) is a multi-carrier modulation method with which the transmission data is modulated over multiple sub-carriers and then transmitted in parallel. This method is widely applied in wireless communication systems due to its good characteristics of resisting frequency selective fading and narrow-band interference. The OFDM system is very sensitive to frequency offsets, such as the carrier frequency offset caused by the frequency offset between the transmitter and the receiver. The carrier frequency offset leads to a series of problems, for example, sub-carrier phase rotation, amplitude fading and ICI (inter-carrier interference), which limit the application of the OFDM technology. Therefore, how to cancel the inter-carrier interference is very important for the OFDM system.

A transmission method and apparatus for cancelling inter-carrier interference in OFDM systems is disclosed in a patent application published with No. EP 1496659A1 on Jan. 12, 2005, entitled "Transmitting and receiving apparatus and method in an orthogonal frequency division multiplexing system using an insufficient cyclic prefix". The OFDM system has N sub-carriers, wherein K sub-carriers are designated as redundant sub-carriers. A transmission apparatus, provided by the patent application, comprises a P filter, for receiving (N-K) data symbols and generating K virtual data symbols, and an IFFT (Inverse Fast Fourier Transformer) having N input taps corresponding to the N sub-carriers. The IFFT receives the (N-K) data symbols and the K virtual data symbols corresponding to the redundant sub-carriers, and performs inverse fast Fourier transformation on the (N-K) data symbols and the K virtual data symbols to output a data frame. Here, the K virtual data symbols are set to a certain value so that the value of the time domain signals that generate ICI is zero in the data frame, resulting in cancellation of the interferences generated among multiple sub-carriers.

In a practical communication system, a plurality of sub-carriers corresponding to an OFDM symbol can generally further carry data with different characteristics, specifically, carry data on the common channels and data on the traffic channels simultaneously. Data with different characteristics will generate different ICI. For example, data on the broadcast channels and the synchronization channels generally will bring larger interference to data transmitted in parallel on the traffic channel due to its higher transmitting power, and sometimes even will become a bottle-neck problem for the transmission design.

There exists a need to provide an effective transmission method and apparatus to cancel interference from a set of consecutive sub-carriers to another set of sub-carriers.

A technical problem to be solved in the present invention is to cancel the interference from a set of consecutive sub-carriers to another set of sub-carriers in a plurality of sub-carriers corresponding to the same transmission symbol.

To achieve the above object, the invention provides a transmission method for cancelling inter-carrier interference in wireless communication systems, comprising: first, configuring at least one isolated sub-carrier between a first set of sub-carriers and a second set of sub-carriers; second, determining the data values on the isolated sub-carriers such that the inter-carrier interference, resulting from the isolated sub-carriers, to the second set of sub-carriers compensates the inter-carrier interference resulting from the first set of sub-carriers to the second set of sub-carriers; and finally, transmitting the data via a plurality of sub-carriers comprising the first set of sub-carriers, the second set of sub-carriers and the isolated sub-carriers.

The invention also provides a transmission apparatus for cancelling inter-carrier interference in wireless communication systems, comprising: a configuration unit, for configuring at least one isolated sub-carrier between a first set of sub-carriers and a second set of sub-carriers; a determination unit, for determining the data values on the isolated sub-carriers such that the inter-carrier interference, resulting from the isolated sub-carriers, to the second set of sub-carriers compensates the inter-carrier interference resulting from the first set of sub-carriers to the second set of sub-carriers; and a transmission unit, for transmitting the data on a plurality of sub-carriers comprising the first set of sub-carriers, the second set of sub-carriers and the isolated sub-carriers.

In sum, with the transmission method and apparatus provided by the invention, the interference from a set of consecutive sub-carriers to another set of sub-carriers can be cancelled effectively when the two sets of consecutive sub-carriers are parts of a plurality of sub-carriers corresponding to a same transmission symbol.

Other aspects and attainments together with a fuller understanding of the invention will become apparent and appreciated by referring to the following descriptions and claims taken in conjunction with the accompanying drawings.

Throughout all the above drawings, like reference numerals will be understood to refer to like, similar or corresponding features or functions.

Detailed descriptions will be made below to the transmission method and apparatus for ICI cancellation provided in the invention taken in conjunction with the accompanying drawings.

The transmission method for ICI cancellation provided in the invention helps to cancel the interference from a set of interfering source sub-carriers to the target sub-carriers by configuring at least an isolated sub-carriers between the set of interfering source sub-carriers and the set of target sub-carriers and further setting a certain value for the isolated sub-carriers.

Figure 1:
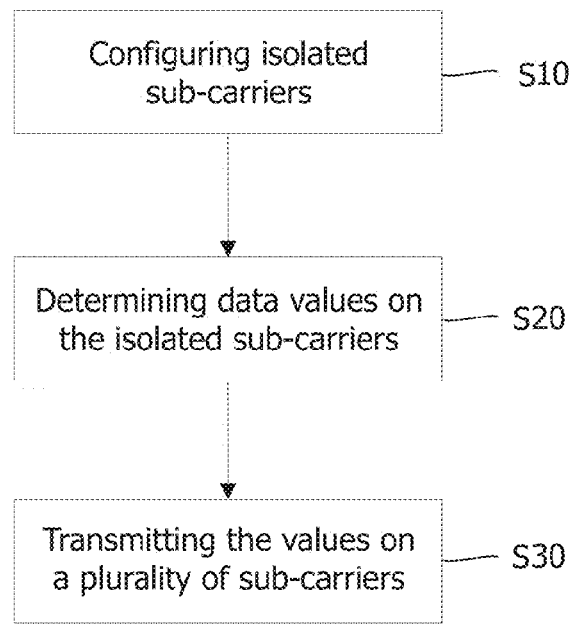
FIG. 1 is a flow chart illustrating the transmission method for ICI cancellation according to the invention.

FIG. 1 is a flow chart illustrating the transmission method for ICI cancellation according to the invention. As shown in FIG. 1, the method provided in the invention comprises the steps of: configuring at least one isolated sub-carrier between a first set of sub-carriers and a second set of sub-carriers (step S10); determining the data values on the isolated sub-carriers such that the inter-carrier interference, resulting from the isolated sub-carriers, to the second set of sub-carriers compensates the inter-carrier interference resulting from the first set of sub-carriers to the second set of sub-carriers (step S20); and transmitting the data via a plurality of sub-carriers comprising the first set of sub-carriers, the second set of sub-carriers and the isolated sub-carriers (step S30).

In the transmission method for ICI cancellation in FIG. 1, the first set of sub-carriers is a set of sub-carriers generating interference, referred to as the interfering source sub-carriers herein and thereafter, and the second set of sub-carriers is a set of sub-carriers being interfered, referred to as the target sub-carriers herein and thereafter. The number of isolated sub-carriers configured between the first set of sub-carriers and the second set of sub-carriers can be adjusted according to practical requirements. When there are multiple sets of interfering sub-carriers or target sub-carriers in a plurality of sub-carriers corresponding to an OFDM symbol, multiple sets of isolated sub-carriers can be configured.

In a practical communication system, when a plurality of sub-carriers corresponding to an OFDM symbol carry data on the common channels (such as, broadcast channel and SYN channel) and data on the traffic channels simultaneously, the common channels usually occupy a set of sub-carriers at the central frequency in the overall transmission band. For example, in an E-UTRA mobile communication system with different transmission bandwidths, its downlink common channels generally occupy a set of sub-carriers in the middle of the bands to adapt the changes of the transmission bandwidths, i.e. when the transmission bandwidth configured for a cell ranges between 1.25 MHz and 20 MHz. This means that both sides of the common channels can be used for traffic channels and meanwhile the traffic channels will experience interferences from the data on the common channels. In this case, there is a need to configure the isolated sub-carriers at both sides of the common channels to cancel ICI.

Figure 2:
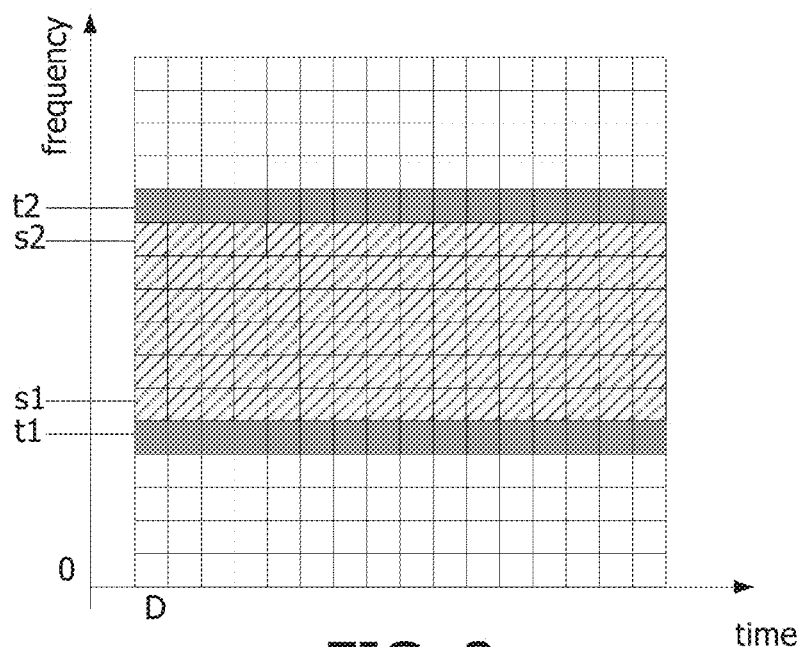
FIG. 2 shows a first exemplary sub-carrier configuration of the transmission method for ICI cancellation according to the invention.

FIG. 2 shows a first exemplary sub-carrier configuration of the transmission method for ICI cancellation according to the invention. In the sub-carrier configuration shown in FIG. 2, multiple sub-carriers corresponding to an OFDM symbol D comprise a set of interfering source sub-carriers and two sets of target sub-carriers, and a first and second isolated sub-carriers are respectively configured between the set of interfering source sub-carriers and each set of target sub-carriers. Referring to FIG. 2, the horizontal axis denotes time, each grid corresponding to an OFDM symbol interval, and the vertical axis denotes frequency, each grid corresponding to a unit of sub-carrier. An OFDM symbol (as shown by D in the figure) comprises multiple sub-carriers, the blank grids represent the data sub-carriers, namely the target sub-carriers; the diagonal grids represent the interfering source sub-carriers, such as the data carried on the common channels; and the shaded grids represent the configured isolated sub-carriers. The $s_1$ and $s_2$ are the sequence numbers for the first and the $N^{th}$ interfering source sub-carriers, and the $t_1$ and $t_2$ are the sequence numbers for the isolated sub-carriers. For the embodiment shown in FIG. 2, the number of the isolated sub-carriers configured between a set of interfering source sub-carriers and a set of target data sub-carriers is one.

Figure 3:
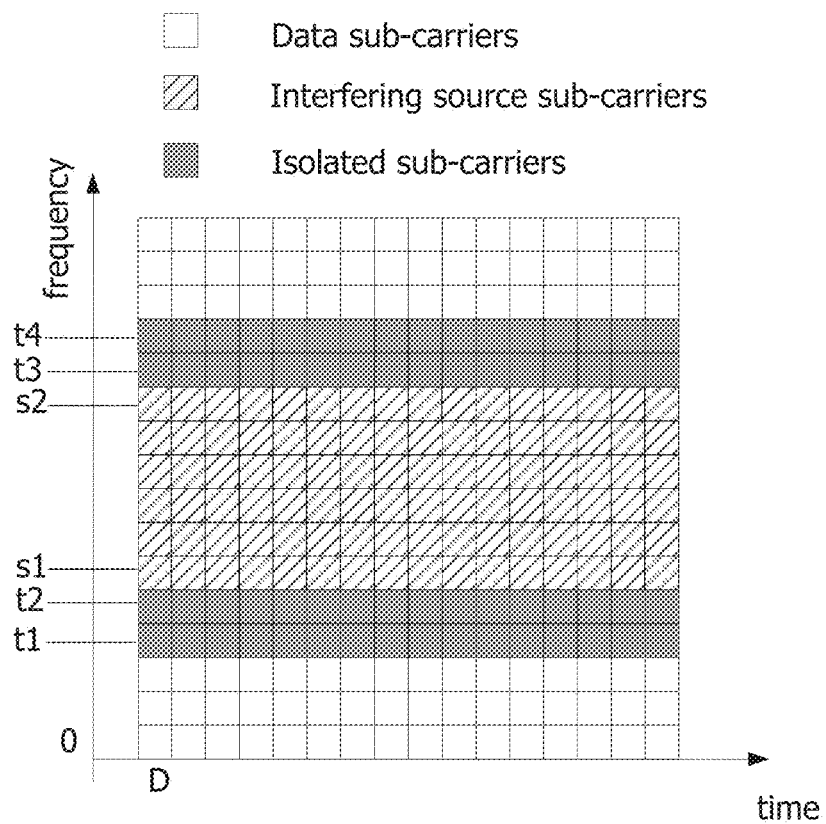
FIG. 3 shows a second exemplary sub-carrier configuration of the transmission method for ICI cancellation according to the invention.

FIG. 3 shows a second exemplary sub-carrier configuration of the transmission method for ICI cancellation according to the invention. The sub-carrier configuration shown in FIG. 3 is same as in FIG. 2 except that for the sub-carriers in FIG. 3, the number of the isolated sub-carriers configured between a set of interfering source sub-carriers and a set of target sub-carriers is two.

Figure 4:
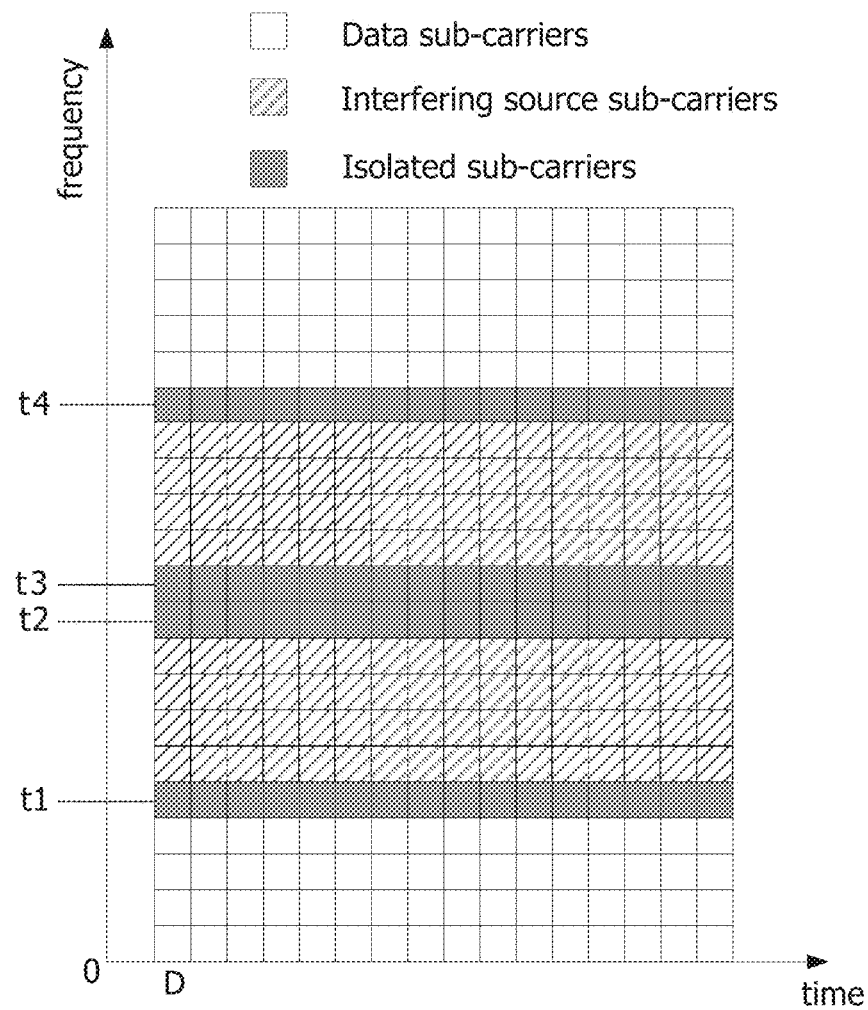
FIG. 4 shows a third exemplary sub-carrier configuration of the transmission method for ICI cancellation according to the invention.

FIG. 4 shows a third exemplary sub-carrier configuration of the transmission method for ICI cancellation according to the invention. The sub-carrier configuration shown in FIG. 4 is same as in FIG. 2 except that for the sub-carriers in FIG. 4, the isolated sub-carriers are configured between two sets of the interfering source sub-carriers to cancel the interference generated between the two sets of the interfering source sub-carriers.

Figure 5:
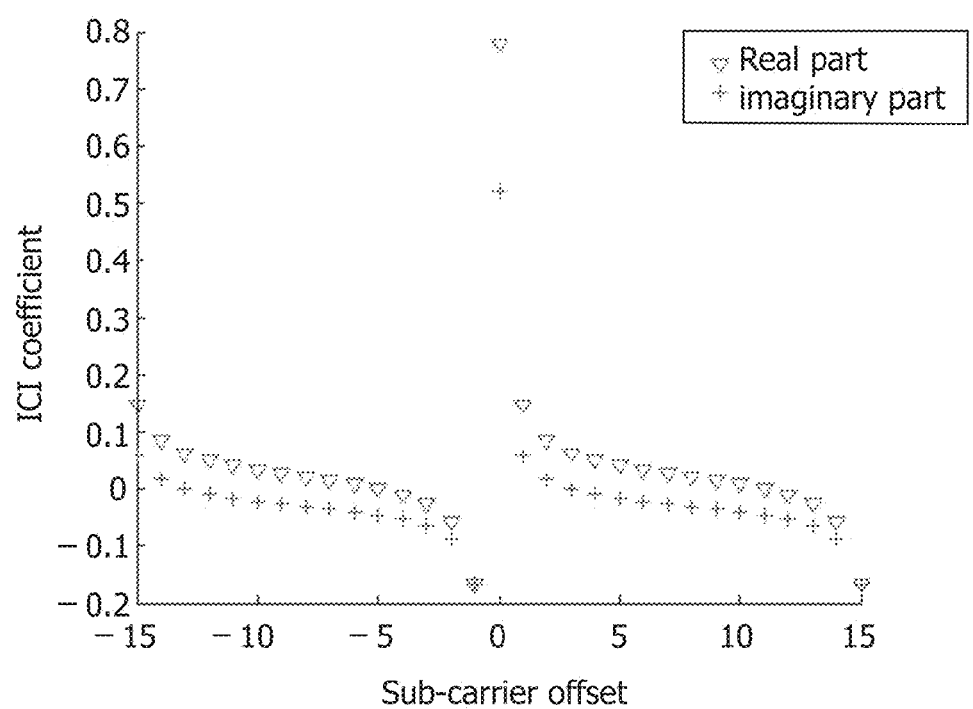
FIG. 5 is a diagram showing how the real and imaginary components of the sub-carrier interference weighting coefficients vary with the carrier frequency offset in a conventional OFDM system.

FIG. 5 is a diagram showing how the interference coefficients for the sub-carriers vary with the carrier frequency offset in a conventional OFDM system. Detailed explanations will be given below to the method for setting the data values on the isolated sub-carriers with reference to FIG. 1 to FIG. 5.

The ICI (inter carrier interference) is unique to wireless communication systems that are based on OFDM or other multi-carrier techniques and generally caused by the incomplete orthogonality between several sub-carriers, such as the carrier frequency offset between the transmitter and the receiver, the Doppler frequency offset and so on. Taking an OFDM system with 16 sub-carriers as an example, when the orthogonality between the sets of sub-carriers is destroyed, the data on a sub-carrier will experience interference from the data on other sub-carriers. Referring to "Analysis of new and existing methods of reducing inter-carrier interference due to carrier frequency offset in OFDM", Jean Armstrong, IEEE Trans. Commun., 1999, 47, 3:365-369, the interference to the $i^{th}$ sub-carrier from the data on other sub-carriers can be given by:

$$d_i' = c_0 d_i + l = 0.\text{about.}15 l.\text{noteq.} i c_{l-i} d_l \quad (1)$$

Where $d_i$ is the data sent on the $i^{th}$ sub-carrier, $d_i$ is the corresponding data received at the receiver, $c_{l-i}$ is the coefficient for the interference on the $i^{th}$ sub-carrier resulting from the date on the $l^{th}$ sub-carrier, $c_0$ is the transmission coefficient for the useful signal $d_i$, and $0 \leq i \leq 15$, $-15 \leq l-i \leq 15$.

In the diagram of FIG. 5 showing the sub-carrier interference coefficient with varying offset of the carrier frequency, the horizontal axis denotes the carrier frequency offset between the interfering source sub-carriers and the target sub-carriers, which is multiple times of the sub-carrier frequency band, and the vertical axis denotes the real and imaginary components of the sub-carrier interference coefficient, whose value vary with respect to the carrier frequency offset. It can be seen from the figure that the amplitudes for the real and imaginary components of the interference coefficients between adjacent sub-carriers change slightly, and the amplitudes for the interference coefficients decrease gradually while the carrier frequency offset between the interfering source sub-carrier and the target sub-carrier increases. In conventional ICI cancellation methods, two sub-carriers for each data in the same OFDM symbol are employed to reduce the ICI at the cost of transmission efficiency, where the positive phase of the data is transmitted on one sub-carrier and the negative phase of the data is transmitted on the other sub-carrier. By further analyzing the representation of the ICI in Equation (1) and the characteristics that ICI varies with respect to the carrier frequency offset in FIG. 5, it can be found that the ICI coefficient curve can be fit by a reciprocal function for the frequency offset between the interfering source sub-carriers and the target sub-carriers. Further, when the interfering source sub-carriers only occupy a small portion of the overall transmission bandwidth, the ICI coefficient curve tends to be flat and the coefficients for the interferences from various interfering source sub-carriers to the target sub-carriers are approximately equal. This analysis result can be used to provide a detailed description to the step S20 in the interference cancellation method provided in the invention.

In the sub-carrier configuration as shown in FIG. 2, the target sub-carriers are distributed on both sides of the interfering source sub-carriers and two isolated sub-carriers are respectively configured between the interfering source sub-carriers and the target sub-carriers. The values on the isolated sub-carriers can be defined as:

EQU00002##

$$Dt1=\textstyle\sum_{n=s1}^{s2} D_n.\text{alpha}.n1,\ Dt2=\sum_{n=s1}^{s2} D_n.\text{alpha}.n2 \quad (2)$$

Where $\alpha_n^1$ and $\alpha_n^2$ are the weighting factors corresponding to the $n^{th}$ sub-carrier in the set of interfering source sub-carriers, $D_n$ is the data carried on the corresponding sub-carriers, $s_1$ and $s_2$ are respectively the sequence numbers for the first and the $N^{th}$ sub-carriers in the set of interfering source sub-carriers, and N is the number of sub-carriers in the set of interfering source sub-carriers.

In the sub-carrier configuration as shown in FIG. 3, the target sub-carriers are distributed on both sides of the interfering source sub-carriers and two isolated sub-carriers are respectively configured between the interfering source sub-carriers and the target sub-carriers. The values on the isolated sub-carriers can be defined as:

EQU00003##

$$Dt1=\beta_2.\beta_1+\beta_2*\textstyle\sum_{n=s1}^{s2} D_n.\text{alpha}.n1,$$
$$Dt2=\beta_2.\beta_1+\beta_2*\textstyle\sum_{n=s1}^{s2} D_n.\text{alpha}.n1 \quad (3\text{-}1)$$

$$Dt3=\beta_1.\beta_1+\beta_2*\textstyle\sum_{n=s1}^{s2} D_n.\text{alpha}.n2,$$
$$Dt4=\beta_2.\beta_1+\beta_2*\textstyle\sum_{n=s1}^{s2} D_n.\text{alpha}.n2 \quad (3\text{-}2)$$

Where $\beta_1$ and $\beta_2$ are respectively the interference allocation factors for the two isolated sub-carriers, and the other parameters have the same meaning as those in Equation (2).

The weighting factors $\alpha_n^1$ and $\alpha_n^2$ in Equations (2), (3-1) and (3-2) can be determined on the basis of the characteristics that the ICI varies with respect to the carrier frequency offset, and the data values on the isolated sub-carriers can be optimized by this so that the interference from the isolated sub-carriers to the target sub-carriers can compensate most of the interference resulting from the interfering source sub-carriers to the target sub-carriers.

When the inference coefficient between the interfering source sub-carriers and the target sub-carriers is inversely proportional to the frequency offset between the interfering source sub-carriers and the target sub-carriers, the $\alpha_n^1$ and $\alpha_n^2$ can be given by:

EQU00004##

$$\alpha.n1=-1N-n+1=\alpha.n2 \quad (4)$$

When the interfering source sub-carriers only occupy a small portion of the overall transmission bandwidth and the inference coefficient between the interfering source sub-carriers and the target sub-carriers goes flat with respect to the frequency offset between the interfering source sub-carriers and the target sub-carriers, the $\alpha_n^1$ and $\alpha_n^2$ can be given by:

EQU00005##

$$\alpha.n1=-12=\alpha.n2 \quad (5)$$

With the above equations (2), (3) or (4), the data values on the isolated sub-carriers configured under different application scenarios can be set.

Figure 6:
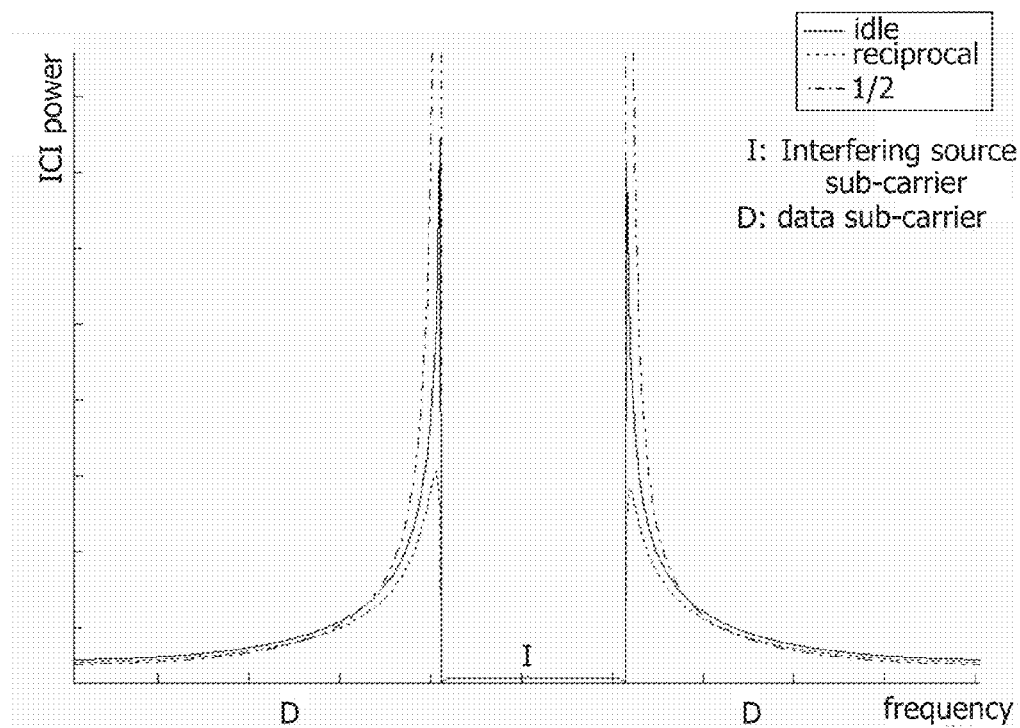
FIG. 6 is a diagram showing the simulation result for the interference cancellation achieved with the transmission method for ICI cancellation provided in the invention.

FIG. 6 is a diagram showing the simulation result for the interference cancellation method provided in the invention. The corresponding simulation environment can be characterized in that the central carrier frequency is 2 GHz, the transmission bandwidth is 5 MHz, and the sub-carrier bandwidth is 15 KHz, namely an OFDM symbol corresponding to 301 sub-carriers (the middle one is not modulated and not used for data transmission), wherein, the number N of interfering source sub-carriers I is 76 and 112 target sub-carriers, namely data sub-carriers D, are distributed uniformly on both sides, two isolated sub-carriers are respectively configured between the set of interfering source sub-carriers and the set of target sub-carriers, and the wireless transmission environment for simulation is Rayleigh Fast Fading Channel.

In practical deployment of communication systems, the above method of transmitting one data by two sub-carriers to cancel ICI mentioned before are generally not used because the transmission efficiency for the method can only reach 50%. A common approach is to set the sub-carriers that are adjacent to the interfering source having more serious interference idle, i.e. set as the idle sub-carriers, therefore the idle sub-carrier scheme is taken as the reference scheme in the simulation to launch performance comparison.

As indicated in FIG. 6, the solid line shows the performance curve when the isolated sub-carriers are idle, the dotted line shows the performance curve when a fixed weighting factor (−½, in Equation 5) is used, and the dot dashed line shows the performance curve when a reciprocal function (Equation 4) is used. It can be seen from FIG. 6 that the performance on the target sub-carriers near the interfering sources goes worse from the reciprocal function scheme, the idle sub-carrier scheme to the fixed weighting factor scheme, as compared with idle sub-carriers. While on the target sub-carriers far from the interfering sources, the performance goes worse from the fixed weighting factor scheme, the reciprocal function scheme, to the idle sub-carrier scheme.

In sum, the reciprocal function scheme obtains better performance than the idle sub-carrier scheme in all situations and thus can be taken as a commonly used scheme. The fixed weighting factor scheme can achieve optimal performance when the target sub-carriers are far away from the interfering source and thus can be used in some particular situations, for example, when minimum sum of the interference powers on the overall target sub-carriers is requested.

FIG. 6 provides a case where a pair of isolated sub-carriers is configured on both sides of the interfering source sub-carriers. The scheme and the conclusion also apply to the case where one isolated sub-carrier is configured on only one side, namely the target sub-carriers are distributed on one side of the isolated sub-carriers.

On the other hand, the isolated sub-carrier scheme will cause only slight loss of the transmission efficiency. Table 1 provides the transmission efficiency loss analysis caused by the ICI cancellation method provided in the invention by taking a practical 3GPP LTE system as an example. It can be known from Table 1 that this method only cause slight transmission efficiency loss, especially when the transmission bandwidth is large, the loss of transmission efficiency can almost be ignored.

TABLE 1
Transmission efficiency loss analysis

| Transmission Bandwidth | 1.25 MHz | 2.5 MHz | 5 MHz | 10 MHz | 15 MHz | 20 MHz |
|---|---|---|---|---|---|---|
| Total sub-carriers | 76 | 151 | 301 | 601 | 901 | 1201 |
| Interfering source sub-carriers | 76 | 76 | 76 | 76 | 76 | 76 |
| Isolated sub-carriers | 2~4 | 2 | 2 | 2 | 2 | 2 |
| Transmission efficiency loss | 2.6%~5.3% | 1.3% | 0.66% | 0.33% | 0.22% | 0.17% |

Figure 7:
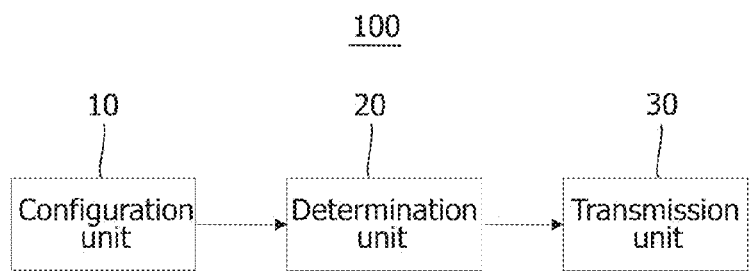
FIG. 7 is a block diagram showing an embodiment of the transmission apparatus for ICI cancellation according to the invention.

The method for cancelling interference from a set of interfering source sub-carriers to a set of target sub-carriers taken in conjunction with FIG. 1 can be implemented in software or hardware or in combination of both. FIG. 7 is a block diagram showing an embodiment of a transmission apparatus 100 for ICI cancellation according to the invention. The transmission apparatus comprises a configuration unit 10, a determination unit 20 and a transmission unit 30.

The configuration unit 10 is mainly used for configuring at least one isolated sub-carrier between a first set of sub-carriers, namely interfering source sub-carriers, and a second set of sub-carriers, namely target sub-carriers. The specific operations can be referred in the configuration scheme shown in FIGS. 2-4.

The determination unit 20 is mainly used for determining the data values on the isolated sub-carriers such that the inter-carrier interference, resulting from the configured isolated sub-carrier, to the target sub-carriers compensates the inter-carrier interference resulting from the interfering source sub-carriers to the target sub-carriers. The method for determining the data values on the isolated sub-carriers can be referred in Equations (2), (3-1), (3-2) and (4) with reference to the configuration schemes shown in FIGS. 2-4 and the description is omitted herein.

The transmission unit 30 is mainly used for transmitting the data on a plurality of sub-carriers comprising the interfering source sub-carriers, the target sub-carriers and the isolated sub-carriers. In an OFDM system, there is generally a step for transforming the data on the sub-carriers corresponding to an OFDM symbol from the frequency domain to the time domain by using the IFFT, before outputting the data corresponding to a plurality of sub-carriers to the transmission antenna. The transformation is a common general knowledge implemented with OFDM technologies and the description is omitted herein.

It is to be understood by those skilled in the art that the invention applies not only to OFDM systems, but also to MC-CDMA (Multi-Carrier Code Division Multiple Access) systems and SC-FDMA (Single Carrier Frequency Division Multiple Access) systems that have multi-carrier characteristics.

It is to be understood by those skilled in the art that the specific embodiments in the invention are intended to be illustrative rather than limiting. Various improvements and modifications can be made to the method and apparatus for ICI cancellation in wireless communication systems as provided in the present invention without departing from the basis of the present invention, the scope of which is to be defined by the attached claims herein.

The invention claimed is:

1. A transmission method of operating a transmission apparatus for cancelling inter-carrier interference, the method comprising: in the transmission apparatus:

configuring, by a configuration unit, at least one isolated sub-carrier between a first set of sub-carriers and a second set of sub-carriers;

determining, by a determination unit, a symbol value of non-zero magnitude on the at least one isolated sub-carrier such that a first inter-carrier interference, resulting from the at least one isolated sub-carrier to the second set of sub-carriers compensates a second inter-carrier interference resulting from the first set of sub-carriers on the second set of sub-carriers, wherein the determined symbol value of non-zero magnitude on the at least one isolated sub-carrier is determined based on a combination of a weighted sum of the data symbols on each of the first set of sub-carriers, and a weighting factor corresponding to each of the sub-carriers being determined by inter sub-carrier interference characteristics; and transmitting, by a transmission unit, the determined symbol value of non-zero magnitude via a plurality of sub-carriers comprising the first set of sub-carriers, the second set of sub-carriers and the at least one isolated sub-carrier, and wherein inter sub-carrier interference characteristics is assumed by the determination unit to be characterized such that the interference coefficient between interfering source sub-carriers and target sub-carriers is inversely proportional to a frequency offset between the interfering source sub-carriers and the target sub-carriers.

2. The transmission method according to claim 1, wherein when the number of at least one isolated sub-carrier is 1, the symbol value $D_{t1}$ on the at least one isolated sub-carrier is determined by:

$$D_{t1} = \sum_{n=s1}^{s2} D_n \alpha_n^1$$

$$\alpha_n^1 = -\frac{1}{N-n+1}$$

Where $\alpha_n^1$ is the weighting factor corresponding to the nth sub-carrier in the first set of sub-carriers, N is the number of sub-carriers in the first set of sub-carriers, $D_n$ is the data symbol carried on the corresponding sub-carrier, and $s_1$ and $s_2$ are the sequence numbers for the first and the Nth sub-carriers, respectively.

3. The transmission method according to claim 1, wherein when the number of isolated sub-carriers is 2, the non-zero symbol values $D_{t1}$ and $D_{t2}$ on the isolated sub-carriers are determined respectively by:

$$D_{t1} = \frac{\beta_2}{\beta_1 + \beta_2} * \sum_{n=s1}^{s2} D_n \alpha_n^1$$

$$D_{t2} = \frac{\beta_1}{\beta_1 + \beta_2} * \sum_{n=s1}^{s2} D_n \alpha_n^1$$

$$\alpha_n^1 = -\frac{1}{N-n+1}$$

where $\alpha_n^1$ is the weighting factor corresponding to the nth sub-carrier in the first set of sub-carriers, N is the number of sub-carriers in the first set of sub-carriers, $D_n$ is the data symbol carried on the corresponding sub-carrier, $s_1$ and $s_2$ are the sequence numbers for the first and the Nth sub-carriers, and $\beta_1$ and $\beta_2$ are the interference allocation factors for the two isolated sub-carriers, respectively.

4. The transmission method according to claim 1, wherein the interference coefficient between the interfering source sub-carriers and the target sub-carriers becomes substantially independent of the frequency offset between the interfering source sub-carriers and the target sub-carriers.

5. The transmission method according to claim 1, wherein for a single isolated sub-carrier, the symbol value $D_{t1}$ on the isolated sub-carrier is determined by:

$$D_{t1} = \sum_{n=s1}^{s2} D_n \alpha_n^1$$

$$\alpha_n^1 = -\frac{1}{L}$$

Where $\alpha_n^1$ is the weighting factor corresponding to the nth sub-carrier in the first set of sub-carriers, L is a constant, $D_n$ is the data symbol carried on the corresponding sub-carrier, and $s_1$ and $s_2$ are the sequence numbers for the first and the Nth sub-carriers.

6. Transmission apparatus for cancelling inter-carrier interference, comprising:
a configuration unit, configured to configure at least one isolated sub-carrier between a first set of sub-carriers and a second set of sub-carriers;
a determination unit, configured to determine non-zero symbol values on the at least one isolated sub-carrier such that a first inter-carrier interference, resulting from the at least one isolated sub-carrier, to the second set of sub-carriers compensates a second inter-carrier interference resulting from the first set of sub-carriers on the second set of sub-carriers, wherein the non-zero symbol values on the at least one isolated sub-carrier are determined based on a combination of the weighted sum of the data on each of the first set of sub-carriers and a weighting factor corresponding to each of the first and second set of sub-carriers being determined by inter sub-carrier interference characteristics; and
a transmission unit, configured to transmit the data via a plurality of sub-carriers comprising the first set of sub-carriers, the second set of sub-carriers and the at least one isolated sub-carrier,
wherein the inter sub-carrier interference characteristics is assumed by the determination unit such that the interference coefficient between interfering source sub-carriers and target sub-carriers is inversely proportional to a frequency offset between the interfering source sub-carriers and the target sub-carriers.

7. The transmission apparatus according to claim 6, wherein for a single isolated sub-carrier, the symbol value $D_{t1}$ on the isolated sub-carrier is determined by:

$$D_{t1} = \sum_{n=s1}^{s2} D_n \alpha_n^1$$

$$\alpha_n^1 = -\frac{1}{N-n+1}$$

Where $\alpha_n^1$ is the weighting factor corresponding to the nth sub-carrier in the first set of sub-carriers, N is the number of sub-carriers in the first set of sub-carriers, $D_n$ is the data symbol carried on the corresponding sub-carrier, and $s_1$ and $s_2$ are the sequence numbers for the first and the Nth sub-carriers.

8. The transmission apparatus according to claim 6, wherein the interference coefficient between the interfering source sub-carriers and the target sub-carriers becomes substantially independent of the frequency offset between the interfering source sub-carriers and the target sub-carriers.

9. The transmission apparatus according to claim 6, wherein for a single isolated sub-carrier, the symbol value $D_{t1}$ on the isolated sub-carrier is determined by:

$$D_{t1} = \sum_{n=s1}^{s2} D_n \alpha_n^1$$

$$\alpha_n^1 = -\frac{1}{L}$$

Where $\alpha_n^1$ is the weighting factor corresponding to the nth sub-carrier in the first set of sub-carriers, L is a constant, $D_n$ is the data symbol carried on the corresponding sub-carrier, and $s_1$ and $s_2$ are the sequence numbers for the first and the Nth sub-carriers.

10. The transmission apparatus according to claim 6, wherein in the case where the number of the isolated sub-carriers is 2, the non-zero symbol values $D_{t1}$ and $D_{t2}$ on the isolated sub-carriers are determined respectively by:

$$D_{t1} = \frac{\beta_2}{\beta_1 + \beta_2} * \sum_{n=s1}^{s2} D_n \alpha_n^1$$

$$D_{t2} = \frac{\beta_1}{\beta_1 + \beta_2} * \sum_{n=s1}^{s2} D_n \alpha_n^1$$

$$\alpha_n^1 = -\frac{1}{N-n+1}$$

Where $\alpha_n^1$ is the weighting factor corresponding to the nth sub-carrier in the first set of sub-carriers, N is the number of sub-carriers in the first set of sub-carriers, $D_n$ is the data symbol carried on the corresponding sub-carrier, $s_1$ and $s_2$ are the sequence numbers for the first and the Nth sub-carriers, and $\beta_1$ and $\beta_{\alpha 2}$ are the interference allocation factors for the two isolated sub-carriers, respectively.

11. A computer-readable storage medium, that is not a transitive propagating signal or wave, having stored thereon instructions that when executed cause processing circuitry of a transmission apparatus to:
configure by at least one configuration unit, at least one isolated sub-carrier between a first set of sub-carriers and a second set of sub-carriers;
determine, by a determining unit, a symbol value on the at least one isolated sub-carrier such that a first inter-carrier interference, resulting from the at least one isolated sub-carrier to the second set of sub-carriers compensates a second inter-carrier interference resulting from the first set of sub-carriers on the second set of sub-carriers,
wherein the determined symbol values on the at least one isolated sub-carrier are determined based on a combination of a weighted sum of the data on each of the first set of sub-carriers, and a weighting factor corresponding to each of the sub-carriers being determined by inter sub-carrier interference characteristics; and transmit by a transmission unit, the determined symbol values via a plurality of sub-carriers comprising the first set of sub-carriers, the second set of sub-carriers and the at least one isolated sub-carrier, and wherein an interference coefficient between interfering source sub-carriers and target sub-carriers is inversely proportional to a frequency offset between the interfering source sub-carriers and the target sub-carriers.

12. A method for operating a transmission apparatus to cancel inter-carrier interference, the method comprising:

In the transmission apparatus:

configuring, by a configuration unit, at least one isolated sub-carrier between a first set of sub-carriers and a second set of sub-carriers;

determining, by a determination unit, the data values on the isolated sub-carriers such that the inter-carrier interference, resulting from the isolated sub-carriers, to the second set of sub-carriers compensates the inter-carrier interference resulting from the first set of sub-carriers on the second set of sub-carriers, wherein the data values on the isolated sub-carriers are determined based on the weighted sum of the data on each of the first set of sub-carriers, the weighting factor corresponding to each of the sub-carriers being determined by the inter sub-carrier interference characteristics; and transmitting, by a transmission unit, the data via a plurality of sub-carriers comprising the first set of sub-carriers, the second set of sub-carriers and the isolated sub-carriers;

wherein the inter sub-carrier interference characteristics are such that the interference coefficient between interfering source sub-carriers and target sub-carriers is inversely proportional to the frequency offset between the interfering source sub-carriers and the target sub-carriers.

13. A transmission apparatus for cancelling inter-carrier interference, comprising:

a configuration unit, configured to configure at least one isolated sub-carrier between a first set of sub-carriers and a second set of sub-carriers;

a determination unit, configured to determine the data values on the isolated sub-carriers such that the inter-carrier interference, resulting from the isolated sub-carriers, to the second set of sub-carriers compensates the inter-carrier interference resulting from the first set of sub-carriers on the second set of sub-carriers, wherein the data values on the isolated sub-carriers are determined based on the weighted sum of the data on each of the first set of sub-carriers, the weighting factor corresponding to each of the sub-carriers being determined by the inter sub-carrier interference characteristics; and a transmission unit, configured to transmit the data via a plurality of sub-carriers comprising the first set of sub-carriers, the second set of sub-carriers and the isolated sub-carriers; and wherein, in the inter sub-carrier interference characteristics, the interference coefficient between interfering source sub-carriers and target sub-carriers is inversely proportional to the frequency offset between the interfering source sub-carriers and the target sub-carriers.

14. A receiver apparatus for receiving a transmission having cancelled inter-carrier interference, comprising:

a receiver unit, configured to receive data via a plurality of sub-carriers comprising a first set of sub-carriers, a second set of sub-carriers and an isolated sub-carriers between the first and second sub carriers; and wherein the data values on the isolated sub-carriers are such that the inter-carrier interference, resulting from the isolated sub-carriers, to the second set of sub-carriers compensates the inter-carrier interference resulting from the first set of sub-carriers on the second set of sub-carriers, wherein the data values on the isolated sub-carriers are based on the weighted sum of the data on each of the first set of sub-carriers, the weighting factor corresponding to each of the sub-carriers being determined by the inter sub-carrier interference characteristics; and wherein, in the inter sub-carrier interference characteristics, the interference coefficient between interfering source sub-carriers and target sub-carriers is inversely proportional to the frequency offset between the interfering source sub-carriers and the target sub-carriers.

15. A communication system, comprising:

at least one transmission apparatus for cancelling inter-carrier interference, comprising:

a configuration unit, configured to configure at least one isolated sub-carrier between a first set of sub-carriers and a second set of sub-carriers;

a determination unit, configured to determine non-zero symbol values on the at least one isolated sub-carrier such that a first inter-carrier interference, resulting from the at least one isolated sub-carrier, to the second set of sub-carriers compensates a second inter-carrier interference resulting from the first set of sub-carriers on the second set of sub-carriers, wherein the non-zero symbol values on the at least one isolated sub-carrier are determined based on a combination of the weighted sum of the data on each of the first set of sub-carriers and a weighting factor corresponding to each of the first and second set of sub-carriers being determined by inter sub-carrier interference characteristics; and a transmission unit, configured to transmit the data via a plurality of sub-carriers comprising the first set of sub-carriers, the second set of sub-carriers and the at least one isolated sub-carrier, wherein the inter sub-carrier interference characteristics is assumed by the determination unit such that the interference coefficient between interfering source sub-carriers and target sub-carriers is inversely proportional to a frequency offset between the interfering source sub-carriers and the target sub-carriers, at least one receiver apparatus for receiving a transmission from the at least one transmission apparatus, the transmission having cancelled inter-carrier interference, the at least one receiver apparatus comprising:

a receiver unit, configured to receive data via a plurality of sub-carriers comprising a first set of sub-carriers, a second set of sub-carriers and an isolated sub-carriers between the first and second sub carriers; and wherein the data values on the isolated sub-carriers are such that the inter-carrier interference, resulting from the isolated sub-carriers, to the second set of sub-carriers compensates the inter-carrier interference resulting from the first set of sub-carriers on the second set of sub-carriers, wherein the data values on the isolated sub-carriers are based on the weighted sum of the data on each of the first set of sub-carriers, the weighting factor corresponding to each of the sub-carriers being determined by the inter sub-carrier interference characteristics; and wherein, in the inter sub-carrier interference characteristics, the interference coefficient between interfering source sub-carriers and target sub-carriers is inversely proportional to the frequency offset between the interfering source sub-carriers and the target sub-carriers.

* * * * *